(12) United States Patent
Moller et al.

(10) Patent No.: US 9,793,732 B2
(45) Date of Patent: Oct. 17, 2017

(54) BATTERY BACKED POWER-OVER-ETHERNET SYSTEM

(75) Inventors: Jeremy G. Moller, County Down (IE);
Ivan Quail, County Antrim (IE);
George J. Redpath, Lisburn (IE);
Mark R. J. Taggart, Antrim (IE)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 288 days.

(21) Appl. No.: 13/056,737

(22) PCT Filed: Aug. 3, 2009

(86) PCT No.: PCT/GB2009/001906
§ 371 (c)(1),
(2), (4) Date: Jan. 31, 2011

(87) PCT Pub. No.: WO2010/013021
PCT Pub. Date: Feb. 4, 2010

(65) Prior Publication Data
US 2011/0133551 A1 Jun. 9, 2011

(30) Foreign Application Priority Data
Aug. 1, 2008 (GB) .................................. 0814154.1

(51) Int. Cl.
*H02J 7/00* (2006.01)
*G06F 1/26* (2006.01)
*H04L 12/10* (2006.01)
*H04L 12/40* (2006.01)

(52) U.S. Cl.
CPC ............ *H02J 7/0068* (2013.01); *G06F 1/266* (2013.01); *H04L 12/10* (2013.01); *H04L 12/40045* (2013.01); *H02J 2007/006* (2013.01); *Y10T 307/25* (2015.04)

(58) Field of Classification Search
CPC .............................. H02J 7/0047; H04L 12/10
USPC .............. 320/132, 137, 134; 307/11; 702/63
See application file for complete search history.

(56) References Cited

U.S. PATENT DOCUMENTS

| | | | |
|---|---|---|---|
| 7,459,886 B1 * | 12/2008 | Potanin et al. ............... | 320/135 |
| 2005/0033997 A1 * | 2/2005 | Boynton et al. .............. | 713/300 |
| 2006/0139002 A1 * | 6/2006 | Zemke et al. ................ | 320/128 |
| 2008/0005600 A1 * | 1/2008 | Diab et al. ................... | 713/300 |
| 2008/0111520 A1 * | 5/2008 | Sasaki .......................... | 320/134 |
| 2008/0114998 A1 * | 5/2008 | Ferentz ................... | H04L 12/12 713/324 |
| 2008/0272736 A1 * | 11/2008 | Tien et al. .................... | 320/126 |
| 2009/0033283 A1 * | 2/2009 | Beg et al. ..................... | 320/128 |

(Continued)

*Primary Examiner* — Nathaniel Pelton

(57) ABSTRACT

A power control system arranged for use in a power-over-Ethernet system and a method of operating the power control system are generally disclosed. The power control system may comprises a battery, a battery charging unit connected to, and for charging, the battery and a processor arranged to monitor the charge level of the battery and, in response, to direct current to, or away from, the battery. The method may comprise the steps of monitoring the current requirement of and the current supplied to, the load; monitoring the charge level of the battery; monitoring the current supplied by the power sourcing device; and adjusting the current supplied to the load, the current supplied by the power sourcing device and charge level of the battery in response to said monitoring.

17 Claims, 2 Drawing Sheets

(56) References Cited

U.S. PATENT DOCUMENTS

Figure 1:
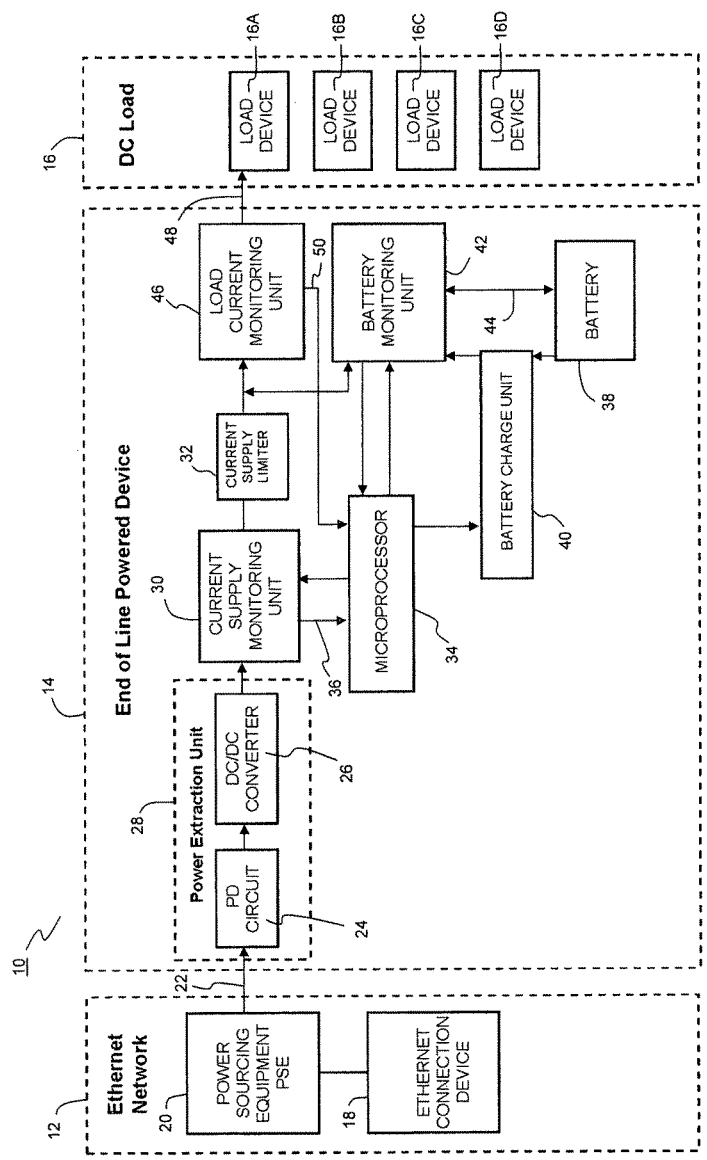

2009/0243391 A1* 10/2009 Susong et al. .................. 307/66
2010/0000809 A1* 1/2010 Nishi et al. ................ 180/65.29

* cited by examiner

BATTERY BACKED POWER-OVER-ETHERNET SYSTEM

This invention relates to a power-over-Ethernet system and, in particular, to a power-over-Ethernet system having a battery back up.

Power-over-Ethernet (PoE) is a method of transmitting electrical power and data simultaneously over standard twisted-pair cable, such as a standard Ethernet category three (Cat 3) cable or a category five (Cat 5) cable, often used in network infrastructures. Power is injected into the cable by power sourcing equipment (PSE).

Power-over-Ethernet is well known, and a number of IEEE industry standards for supplying power-over-Ethernet have been created. In particular, IEEE 802.3-2005 (commonly referred to as IEEE 802.3af) and IEEE 802.3 at are standards for supplying, respectively, regular and high power over an Ethernet network.

One application of PoE is supplying power to a load via a standard Ethernet cable in the circumstances where delivering power from a separate mains power supply would be impractical or prohibitively expensive. In such a case, where existing Ethernet cable is already in use, it is beneficial to make use of PoE in the existing cable to power a load.

In some cases, for example, when the load to be powered is a security device such as a barrier or a door lock, any loss of power to the device could render the barrier or door insecure, thus jeopardising the safety of whatever the security device is intended to secure. The same problem would arise if the source of power became faulty, or if an Ethernet cable was to become faulty or disconnected from the power source.

A further problem with existing power-over-Ethernet systems is that, if the load to which power is being supplied draws more power than the PSE can supply, the PSE will stop injecting power into the Ethernet cable and, therefore, power provided to the load will stop.

An aim of the present invention is to provide a power-over-Ethernet system having a rechargeable battery, or some other rechargeable energy source, for supplying power to a load if the power supplied by the power sourcing equipment is too little or stopped all together.

In a first aspect of the present invention, a power control system arranged for use in a power-over-Ethernet system comprises a battery; a battery charging unit connected to, and for charging, the battery; and a processor arranged to monitor the charge level of the battery and, in response, to direct current to, or away from, the battery.

Preferably, the system further comprises a charge limiter, for preventing the charge level of the battery from increasing beyond a predetermined maximum level, and from decreasing below a predetermined minimum level.

Advantageously, the system further comprises a current input monitoring device, arranged to monitor the current input into the control system.

Preferably, the system further comprises a load current monitoring device, arranged to monitor the current delivered to a load to which the control system is arranged to be connected.

Advantageously, the current input monitoring device further includes current limiting means, for limiting the current delivered to a load to which the control system is arranged to be connected.

Preferably, the system further comprising a battery monitoring unit for measuring the charge level of the battery.

Power may be supplied to the system by an end-span device or a mid-span device and, preferably, the battery is a lead-acid battery.

In another aspect of the present invention, a power-over-Ethernet (PoE) system for delivering power to a load, the system comprises a powered device; and an Ethernet power sourcing device configured to supply DC power to the powered device; the powered device having a battery, a battery charge unit, and a processor, the processor being arranged to monitor the current requirement of the load, and to control the charging of the battery and the supply of current from the battery to the load in response to said monitoring.

The powered device may be an end-span device or a mid-span device.

Preferably, the Ethernet power sourcing device is configured to supply at least 15 W of power to the powered device. More preferably, it is configured to supply at least 30 W of power to the powered device and, even more preferably, it is configured to supply at least 60 W of power to the powered device.

Advantageously, the load comprises one or more of the following group: a barrier, an electric door, an audio alarm, a visual alarm, a mechanical lock, a magnetic lock, a transmitter, a computer, a card reader, a fingerprint reader, a camera, a sensor.

In yet another aspect of the present invention, a method of providing current to a load in a power-over-Ethernet system, the system comprising a power sourcing device, a battery and a processor, the method comprises the steps of: monitoring the current requirement of, and the current supplied to, the load; monitoring the charge level of the battery; monitoring the current supplied by the power sourcing device; and adjusting the current supplied to the load, the current supplied by the power sourcing device and charge level of the battery in response to said monitoring.

Preferably, the method further comprises preventing the charge level of the battery from increasing beyond a predetermined maximum level, and from decreasing below a predetermined minimum level.

Advantageously, if the charge level of the battery is above a predetermined upper level, then current is directed from the battery to the load, in addition to the current being supplied to the load by the power sourcing device and, if the charge level of the battery is below a predetermined lower level, then current is supplied from the power sourcing device to both the load and the battery.

Figure 2:
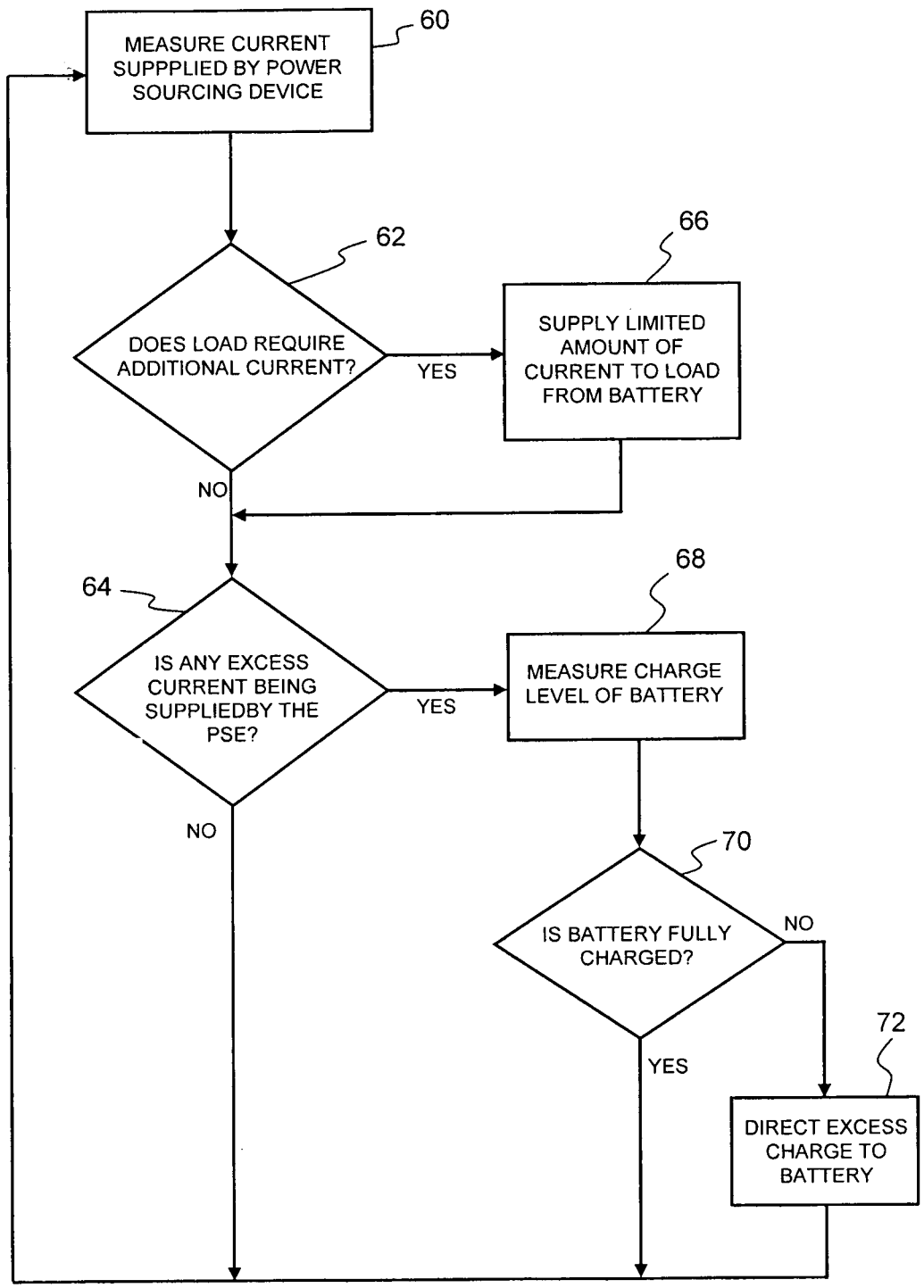

The invention will now be described in greater detail, by way of example, with reference to the drawings, in which:

FIG. 1 is a block diagram of a power-over-Ethernet system constructed according to the present invention;

FIG. 2 is a flow chart showing steps carried out by the method of the present invention; and Referring to the drawings, FIG. 1 shows a power-over-Ethernet (PoE) system, generally denoted 10. The PoE system 10 consists of three elements: an Ethernet network 12, a powered device 14 and a load 16, each of which elements is shown in FIG. 1 by a dashed rectangle.

The Ethernet network 12 consists of a standard Ethernet connection device 18, such as an Ethernet switch or hub, which is well known in the art. The Ethernet network 12 further includes power sourcing equipment (PSE) 20 which sources power from a mains power supply (not shown) or some other source of power. The system 10 is arranged to be compatible with existing Ethernet network infrastructures and, therefore, the Ethernet network 12 may contain various alternatives which are not mentioned here but are intended to be included within the scope of the appendant claims.

The Ethernet network 12 is connected to the powered device 14 by a first Ethernet cable 22. The Ethernet cable 22 can be any standard four-twisted-pair cable suitable for use in an Ethernet system, such as a category 5 (Cat 5) cable or a category 6 (Cat 6) cable, both of which are well known in the art.

The powered device 14 includes powered device circuitry 24 which is connected to a DC/DC converter 26, which are shown in FIG. 1 as components of a power extraction unit 28. The power extraction unit 28 receives the power supplied by the power sourcing equipment 20 via the first standard Ethernet cable 22. The powered device circuitry 24 and the DC/DC converter 26 are both industry standard components, well known in the art. One such component which is suitable for use is an IEEE802.3af POE high power PD controller (reference TPS2376-H), supplied by Texas Instruments. The power extraction unit 28 is capable of providing a 13.8 volt output at a maximum of 4 amps.

The powered device 14 further includes a current supply monitoring unit 30 which is electrically connected to the power extraction unit 28. A current supply limiter 32 is electrically connected to, and works in conjunction with, the current supply monitoring unit 30. A microprocessor 34 is arranged to receive an output 36 from the current supply monitoring unit 30 and control the current supply monitoring unit and the current supply limiter 32. in response to the output. The powered device 14 further includes a battery 38 which is in electrical connection with a battery charge unit 40 and a battery monitoring unit 42. The battery monitoring unit 42 is arranged to receive information relating to the charge level of the battery 38 via a battery output 44. The battery monitoring unit 42 is also in electrical connection with the microprocessor 34, and outputs information about the charge level of the battery 38 to the microprocessor which, in response, controls the battery charge unit 40. The battery monitoring unit 42 includes a battery charge limiter (not shown) which is arranged to prevent the charge of the battery 38 from decreasing below a predetermined minimum value. The microprocessor 34 prevents the battery 38 from receiving current if the battery monitoring unit 42 detects that the charge level of the battery is full or above a predetermined upper limit.

The battery 38 may be any type of battery suitable for use in a PoE system. In a preferred embodiment, a lead acid battery is used. However, it will also be apparent that any other suitable rechargeable energy source could be used in place of the battery 38

The powered device 14 further includes a load current monitoring unit 46. The load current monitoring unit 46 is in electrical connection with the load 16, and is arranged to monitor the current requirement of the load, and to supply the load with current via a load connector 48. The load connector 48 may be any standard electrical wire of suitable rating. The load current monitoring unit 46 has a load monitoring output 50 which is fed into the microprocessor 34. The current supply limiter 32 is also in electrical connection with the load current monitoring unit 46 and with the battery monitoring unit 42.

The load 16 is considered to be either a single load device or a plurality of load devices, shown in FIG. 1 as 16A, 16B, 16C and 16D. Each of the load devices 16A, 16B, 16C, 16D is arranged to receive power in the manner described herein in a PoE system. In a preferred embodiment, four load devices 16A, 16B, 16C, 16D are powered using the PoE system 10: two magnetic locks used on secure access doors, and two security card readers, arranged to allow access to the doors. It will be apparent to a person skilled in the art that the particular load devices that can be used in such a PoE system could be, for example, a barrier, an electric door, a visual alarm, an audio alarm, a mechanical lock, a magnetic lock, a transmitter, a computer, a card or fingerprint reader, a camera, a sensor, or any suitable DC current-drawing load.

The use of a PoE system 10 such as the one described herein will now be described by way of non-limiting examples.

EXAMPLE 1

One or more load devices 16A, 16B, 16C, 16D are connected to the powered device 14 via the load connector 48, and each of the load devices receives power from the power sourcing equipment 20. If the load current monitoring unit 46 detects a requirement for one or more of the load devices 16A, 16B, 16C, 16D to be temporarily provided with power exceeding the maximum output of the power sourcing equipment 20, then the microprocessor 34 will determine whether or not the battery 38 is fully charged, or charged beyond a predetermined level. If so, current from the battery 38 will be supplied to the load devices 16A, 16B, 16C, 16D to supplement the power supplied by the power sourcing equipment 20. For a short period of time, the load devices 16A, 16B, 16C, 16D will be provided with sufficient power to perform a required action. The charge level of the battery 38 is prevented from decreasing below a predetermined minimum limit by the microprocessor 34, and if this limit is reached whilst the battery is supplying power to the load devices 16A, 16B, 16C, 16D, the power supply from the battery will be stopped, and the power required by the load devices will be supplied solely by the power sourcing equipment 20. Once the power requirements of the load devices 16A, 16B, 16C, 16D have reduced, and the power supplied by the power sourcing equipment 20 is greater than the requirements of the load devices, the microprocessor 34 will arrange for the excess power to be supplied to the battery charge unit 40 to charge the battery 38.

The PoE system 10 is arranged to support a power output of up to 60 W from the power sourcing equipment 20. With the supplement power supplied by the battery 38, the total power supplied to the load 16 can, for a limited amount of time, exceed 60 W.

EXAMPLE 2

Once or more load devices 16A, 16B, 16C, 16D are connected to the powered device 14 via the load connector 48, and receive power from the power sourcing equipment 20. At periods when the power required by the load devices 16A, 16B, 16C, 16D is less than the power supplied by the power sourcing equipment 20, the microprocessor 34 arranges for the battery 38 to be charged by the excess power supplied by the power sourcing equipment. If a situation occurs which results in the power sourcing equipment 20 being unable to supply power to the load devices 16A, 16B, 16C, 16D, such as a mains power cut, a fault occurring in the power sourcing equipment, or the Ethernet cable 22 becoming disconnected from either the Ethernet network 12 or the powered device 14, then the current supply monitoring unit 30 senses that no power is being supplied by the power sourcing equipment. The microprocessor 34 then arranges for the battery 38 to supply power to the load devices 16A, 16B, 16C, 16D so that they are still able to function correctly whilst receiving no power from the power sourcing equipment 20. The battery 38 is chosen such that it can provide sufficient power to the load devices 16A, 16B, 16C, 16D for sufficient time to allow alternative measures to be taken, such as replacing a damaged component or a disconnected cable, or restoring power to the power sourcing equipment 20. In a preferred embodiment, the battery 38 is chosen such that, in the absence of power from the power sourcing equipment 20, the load devices 16A, 16B, 16C, 16D can remain fully functional for approximately 4 hours.

FIG. 2 is a flowchart showing the method carried out by the microprocessor 34 and the battery monitoring unit 42 in the powered device 14, when determining whether or not the battery 38 requires charging, or is required to supply power to the load devices 16A, 16B, 16C, 16D. At step 60, current being supplied by the power sourcing equipment 20 is measured. The load current monitoring unit 46 then determines whether or not the load devices 16A, 16B, 16C, 16D require any additional current (step 62). If the load devices 16A, 16B, 16C, 16D do not require additional current, then the current supply monitoring unit 30 determines whether or not any excess current is being supplied by the power sourcing equipment 20 (step 64). However, if the load devices 16A, 16B, 16C, 16D do require additional current, then the battery 38 is used to supply current for a limited amount of time to the load devices (step 66). Once sufficient current has been supplied, step 64 is carried out. At step 64, if it is determined that excess current is not being supplied by the power sourcing equipment 20, then step 60 is repeated. However, if, at step 64, is it determined that excess current is being supplied by the power sourcing equipment 20, then the battery monitoring unit 42 measures the charge level of the battery 38 (step 68) and determines whether or not the battery is fully charged (step 70). If it is determined that the battery 38 is not fully charged, then the excess current being supplied by the power sourcing equipment 20 is directed to the battery charge unit 40 (step 72). Once the battery 38 has been charged, step 60 is repeated. If, at step 70, it is determined that the battery 38 is fully charged, then step 60 is repeated. It will be apparent to a person skilled in the art that the above process occurs in real time, with the monitoring units 30, 42, 46 monitoring their respective devices 28, 38, 16, and outputting information to the microprocessor 34 continuously.

The PoE system described herein uses an end-span power sourcing equipment 20, but it will be apparent to a person skilled in the art that the system could alternatively include mid-span device power sourcing equipment.

It will also be apparent to a person skilled in the art that various other modifications could be made to the apparatus and the method hereinbefore described, which fall within the scope of the appended claims.

The invention claimed is:

1. A powered device arranged for use in a power-over Ethernet system, the powered device comprising:
 a battery;
 a battery charging unit connected to, and for charging, the battery;
 a current input monitoring device configured to monitor current input into the power control system by a power sourcing device;
 a load current monitoring device configured to monitor current requirements of a load device connected to the powered device, wherein the load device is external to, and separate from, the powered device; and
 a processor arranged to monitor a charge level of the battery, the processor configured to direct current to the battery to charge the battery based on a determination that current input into the powered device exceeds the current requirements of the load device, to direct current from the battery to the load device based on a determination that the current requirements of the load device exceed the current input into the powered device, and to stop directing current from the battery to the load device and to direct the current input to the load device based on a determination that the charge level of the battery has reached a predetermined minimum level, and the processor configured to direct current from the battery to the load device based on a determination that there is no current input into the powered device.

2. The powered device of claim 1, further comprising a charge limiter for preventing the charge level of the battery from increasing beyond a predetermined maximum level and from decreasing below the predetermined minimum level.

3. The powered device of claim 1, further comprising a battery monitoring unit connected to the processor and to the battery for measuring the charge level of the battery.

4. The powered device of according to claim 1, further comprising a power extraction unit connected to the current supply monitoring unit, the power extraction unit configured to receive power from an end-span device.

5. The powered device of claim 1, further comprising a power extraction unit connected to the current supply monitoring unit, the power extraction unit configured to receive power from a mid-span device.

6. The powered device of claim 1, wherein the battery is a lead-acid battery.

7. A power-over-Ethernet (PoE) system comprising:
 a powered device; and
 an Ethernet power sourcing device configured to supply DC power to the powered device;
 the powered device having:
  a battery;
  a battery charge unit;
  a current input monitoring device operatively connected in-line between the Ethernet power sourcing device and a load that is external to, and separate from, the powered device, the current input monitoring device configured to monitor current supplied by the Ethernet power sourcing device; and
  a processor, the processor configured to monitor a current requirement of the load, a charge level of the battery, and the current supplied by the Ethernet power sourcing device, the processor further configured to direct current to the battery to charge the battery based on a determination that the current supplied by the Ethernet power sourcing device exceeds the current requirement of the load, to direct current from the battery to the load based on a determination that the current requirement of the load exceeds the current supplied by the Ethernet power sourcing device, and to stop directing current from the battery to the load and to direct the current supplied by the Ethernet power sourcing device to the load based on a determination that the charge level of the battery has reached a predetermined minimum level, and the processor configured to direct current from the battery to the load based on a determination that there is no current supplied by the Ethernet power sourcing device.

8. A PoE system according to claim 7, wherein the powered device is an end-span device.

9. A PoE system according to claim 7 wherein the powered device is a mid-span device.

10. A PoE system according to claim 7, wherein the Ethernet power sourcing device is configured to supply at least 15 W of power to the powered device.

11. A PoE system according to claim 7, wherein the Ethernet power sourcing device is configured to supply at least 30 W of power to the powered device.

12. A PoE system according to claim 7, wherein the Ethernet power sourcing device is configured to supply at least 60 W of power to the powered device.

13. A PoE system according to claim 7, wherein the load comprises one or more of the following group: a barrier, an electric door, an audio alarm, a visual alarm, a mechanical lock, a magnetic lock, a transmitter, a computer, a card reader, a fingerprint reader, a camera, a sensor.

14. A method of providing current in a power-over-Ethernet system, the system including a power sourcing device connected to a powered device that includes a battery, a current input monitoring device including a current supply limiter operatively connected to the power sourcing device, and a processor, the method comprising the steps of:
monitoring a current requirement of, and a current supplied to, a load that is external to, and separate from, the powered device;
monitoring a charge level of the battery;
monitoring a current supplied by the power sourcing device;
determining whether the current supplied by the power sourcing device exceeds the current requirement of the load;
limiting, with the current supply limiter, current delivered the load;
determining whether the current requirement of the load exceeds the current supplied by the power sourcing device;
directing current to the battery to charge the battery based at least in part on a determination that the current supplied by the power sourcing device exceeds the current requirement of the load, directing current from the battery to the load based at least in part on a determination that the current requirement of the load exceeds the current supplied by the power sourcing device, and ceasing directing current from the battery to the load and solely directing current from the power sourcing device to the load based on a determination that the charge level of the battery has reached a predetermined minimum level; and
directing current from the battery to the load based on a determination that there is no current supplied by the power sourcing device.

15. A method according to claim 14, further comprising preventing the charge level of the battery from increasing beyond a predetermined maximum level.

16. A method according to claim 14, wherein, if the charge level of the battery is above a predetermined maximum level, then current is directed from the battery to the load, in addition to the current being supplied to the load by the power sourcing device.

17. A method according to claim 14, wherein, if the charge level of the battery is below the predetermined minimum level, then current is supplied from the power sourcing device to both the load and the battery.

* * * * *